(12) United States Patent
Bentley

(10) Patent No.: US 8,490,496 B2
(45) Date of Patent: *Jul. 23, 2013

(54) MULTI RANGE PRESSURE SENSOR APPARATUS AND METHOD UTILIZING A SINGLE SENSE DIE AND MULTIPLE SIGNAL PATHS

(75) Inventor: Ian Bentley, New Ipwich, NH (US)

(73) Assignee: Honeywell International Inc., Morristown, NJ (US)

( * ) Notice: Subject to any disclaimer, the term of this patent is extended or adjusted under 35 U.S.C. 154(b) by 177 days.

This patent is subject to a terminal disclaimer.

(21) Appl. No.: 13/069,127

(22) Filed: Mar. 22, 2011

(65) Prior Publication Data

US 2011/0179879 A1 Jul. 28, 2011

Related U.S. Application Data

(63) Continuation of application No. 12/389,042, filed on Feb. 19, 2009, now Pat. No. 7,950,286.

(60) Provisional application No. 61/139,319, filed on Dec. 19, 2008.

(51) Int. Cl.
*G01L 9/00* (2006.01)

(52) U.S. Cl.
USPC .......................................................... 73/753

(58) Field of Classification Search
None
See application file for complete search history.

(56) References Cited

U.S. PATENT DOCUMENTS

| | | |
|---|---|---|
| 3,484,732 A | 12/1969 | Postma |
| 4,478,076 A | 10/1984 | Bohrer |
| 4,478,077 A | 10/1984 | Bohrer |
| 4,501,144 A | 2/1985 | Higashi et al. |
| 4,574,640 A | 3/1986 | Krechmery |
| 4,581,928 A | 4/1986 | Johnson |
| 4,651,564 A | 3/1987 | Johnson et al. |
| 4,683,159 A | 7/1987 | Bohrer et al. |
| 4,845,649 A | 7/1989 | Eckardt et al. |
| 4,986,127 A | 1/1991 | Shimada et al. |
| 5,042,307 A | 8/1991 | Kato |
| 5,050,429 A | 9/1991 | Nishimoto et al. |
| 5,089,979 A | 2/1992 | McEachern et al. |
| 5,099,695 A | 3/1992 | Sugano et al. |
| 5,187,985 A | 2/1993 | Nelson |

(Continued)

FOREIGN PATENT DOCUMENTS

EP    0857957 A1    8/1998

OTHER PUBLICATIONS

Celerity, "Dual Range Transducer Display," 2 pages, 2006.

(Continued)

*Primary Examiner* — Andre Allen
(74) *Attorney, Agent, or Firm* — Seager Tufte & Wickhem LLC

(57) ABSTRACT

A multi-range pressure sensor apparatus and method that provide multiple signal paths for detecting a broad range of pressures with a high accuracy. A pressure transducer can be configured to include the use of a pressure sense die with piezoresistive elements integrated into the sensor die and in a Wheatstone bridge configuration. A sensed output signal from the sense die can be transferred to one or more amplifier circuits. A programmable compensation circuit can be utilized to multiplex different amplified output signals from each of the amplifier circuits and to provide a digital output. A memory associated with the programmable compensation circuit provides separate compensations, which are stored for each of the different signal paths and removes errors due to amplifier gain and offset.

22 Claims, 3 Drawing Sheets

U.S. PATENT DOCUMENTS

| | | | |
|---|---|---|---|
| 5,193,393 | A | 3/1993 | Czarnocki |
| 5,321,638 | A | 6/1994 | Witney |
| 5,377,128 | A | 12/1994 | McBean |
| 5,398,194 | A | 3/1995 | Brosh et al. |
| 5,460,050 | A | 10/1995 | Miyano |
| 5,507,171 | A | 4/1996 | Mattes et al. |
| 5,544,529 | A | 8/1996 | Mitani et al. |
| 5,578,962 | A | 11/1996 | Rastegar |
| 6,023,978 | A | 2/2000 | Dauenhauer et al. |
| 6,035,721 | A | 3/2000 | Krisch |
| 6,047,244 | A | 4/2000 | Rud, Jr. |
| 6,169,965 | B1 | 1/2001 | Kubisiak et al. |
| 6,223,593 | B1 | 5/2001 | Kubisiak et al. |
| 6,234,016 | B1 | 5/2001 | Bonne et al. |
| 6,450,005 | B1 | 9/2002 | Bentley |
| 6,502,459 | B1 | 1/2003 | Bonne et al. |
| 6,542,594 | B1 | 4/2003 | LeBoulzec |
| 6,653,959 | B1 | 11/2003 | Song |
| 7,146,864 | B2 | 12/2006 | Sullivan et al. |
| 7,185,538 | B2 | 3/2007 | Hager et al. |
| 7,239,957 | B1 | 7/2007 | Sweet et al. |
| 7,258,016 | B2 | 8/2007 | Maitland, Jr. et al. |
| 7,266,999 | B2 | 9/2007 | Ricks |
| 7,318,351 | B2 | 1/2008 | Cobianu et al. |
| 7,343,812 | B2 | 3/2008 | Stewart et al. |
| 7,377,177 | B1 | 5/2008 | Lamb et al. |
| 7,469,598 | B2 | 12/2008 | Shkarlet et al. |
| 7,520,051 | B2 | 4/2009 | Becke et al. |
| 7,653,494 | B2 | 1/2010 | Neacsu et al. |
| 7,759,945 | B2 | 7/2010 | Wade |
| 7,769,557 | B2 | 8/2010 | Bey et al. |
| 7,950,286 | B2 | 5/2011 | Bentley |
| 8,010,322 | B2 | 8/2011 | Dmytriw et al. |
| 8,024,146 | B2 | 9/2011 | Bey et al. |
| 2002/0083776 | A1 | 7/2002 | Tanizawa |
| 2003/0056597 | A1 | 3/2003 | Wang |
| 2004/0144178 | A1 | 7/2004 | Ohmi et al. |
| 2006/0037403 | A1 | 2/2006 | Yeh et al. |
| 2006/0144156 | A1 | 7/2006 | Borzabadi et al. |
| 2007/0000330 | A1 | 1/2007 | Tysoe et al. |
| 2007/0069000 | A1 | 3/2007 | Schubert |
| 2007/0197922 | A1 | 8/2007 | Bradley et al. |
| 2007/0271070 | A1 | 11/2007 | Dmytriw et al. |
| 2008/0107151 | A1 | 5/2008 | Khadkikar et al. |
| 2008/0196507 | A1 | 8/2008 | Lamb et al. |
| 2009/0073274 | A1 | 3/2009 | Dai |
| 2010/0268485 | A1 | 10/2010 | Bey et al. |
| 2010/0305465 | A1 | 12/2010 | Ricks et al. |

OTHER PUBLICATIONS

Martel Electronics, "PPC-3300 Precision Dual Range Pressure Calibrator," 2 pages, 2002.

Search Report for Corresponding Application No. 09178993.3-1236/2199770 Dated Dec. 16, 2011.

"BDS Series Pressure Sensor," 4 pages, prior to Sep. 6, 2011.

Honeywell, "DCXL-DS Series, SURSENSE Ultra Low Silicon Pressure Sensors," 4 pages, May 2010.

MULTI RANGE PRESSURE SENSOR APPARATUS AND METHOD UTILIZING A SINGLE SENSE DIE AND MULTIPLE SIGNAL PATHS

This application is a continuation of U.S. patent application Ser. No. 12/389,042, filed Feb. 19, 2009, entitled "Multi-Range Pressure Sensor Apparatus And Method Utilizing A Single Sense Die And Multiple Signal Paths," which claims the benefit of U.S. Provisional Patent Application Ser. No. 61/139,319, entitled "Multi-Range Pressure Sensor Apparatus and Method Utilizing a Single Sense Die and Multiple Signal Paths," filed Dec. 19, 2008 and which are incorporated herein by reference.

TECHNICAL FIELD

Embodiments are generally related to sensor devices, methods, and systems. Embodiments are also related to multi-range pressure sensor devices capable of detecting a variety of parameters under varying conditions.

BACKGROUND OF THE INVENTION

The need for accurate, low cost, compact pressure sensors capable of a broad range of measurement is becoming increasingly necessary in a variety of commercial, industrial, military and other applications. Measurement of a broad range of pressures is particularly challenging because of an enormous range of pressures that can be realized. Conventional pressure sensors possess an extremely limited range of pressure measurement capabilities and often cannot be operated over their maximum potential measuring ranges due to their technical design. Additionally, when an anticipated force exceeds the capacity of an individual pressure sensor, multiple pressure sensors having ranges of measurement adjoining one another must be utilized simultaneously.

Furthermore, the arrangement of multiple sensors is correspondingly more complicated. The output signals of the sensors are generally not compatible with one another and must therefore be evaluated in an additional, external electronic circuit in order to recognize which of the sensors is functioning in the permitted range of measurement at a given moment. In such an approach, excessive expenditures of time and money are required to incorporate multiple sensors within a single system. In addition, such the use of two or more independent pressure sensors requires protective valves to avoid damage with respect to more accurate sensors at high pressures.

Based on the foregoing, it is believed that a need exists for an improved multi-range pressure sensor apparatus that is capable of efficiently detecting a broad range of pressures with high accuracy and in a very narrow range, as described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved pressure sensor apparatus, system, and method.

It is another aspect of the present invention to provide for an improved pressure sensor apparatus, system, and method that incorporates the use of a single sense die and multiple signal paths for detecting broad ranges of pressures with high accuracy.

It is a further aspect of the present invention to provide for an improved method, apparatus, and system for removing errors due to amplifier gain and offset.

The aforementioned aspects and other objectives and advantages can now be achieved as described herein. A multi-range pressure sensor apparatus, method, and system having multiple signal paths for detecting broad ranges of pressures with high accuracy are disclosed. A pressure transducer can be configured that includes a pressure sense die with piezoresistive elements integrated into a sensor die in a Wheatstone bridge configuration. A sensed output signal from the sense die can be transferred to one or more amplifier circuits. A programmable compensation integrated circuit can be utilized to multiplex different amplified output signals from each of the amplifier circuits and to provide a digital output. A memory associated with the programmable compensation integrated circuit can be configured to provide separate compensations stored with respect to each of the different signal paths and capable of removing errors due to amplifier gain and offset.

The multiple signal paths from the amplifier circuits with potentially different compensation values stored for each path can generate high accuracy compensations at a low system cost. Each path of the multiple signal paths possesses a different gain that is capable of providing multiple compensated ranges in the pressure sensor. In one embodiment, the amplifier circuits of the pressure sensor can be integral to the sense die and/or integral to the programmable compensation circuit. In another embodiment, the amplifier circuits may be isolated to provide error free output generated due to amplifier gain and offset. Such a multi-range pressure sensor apparatus provides a broad measurement range and high accuracy in a very narrow range.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
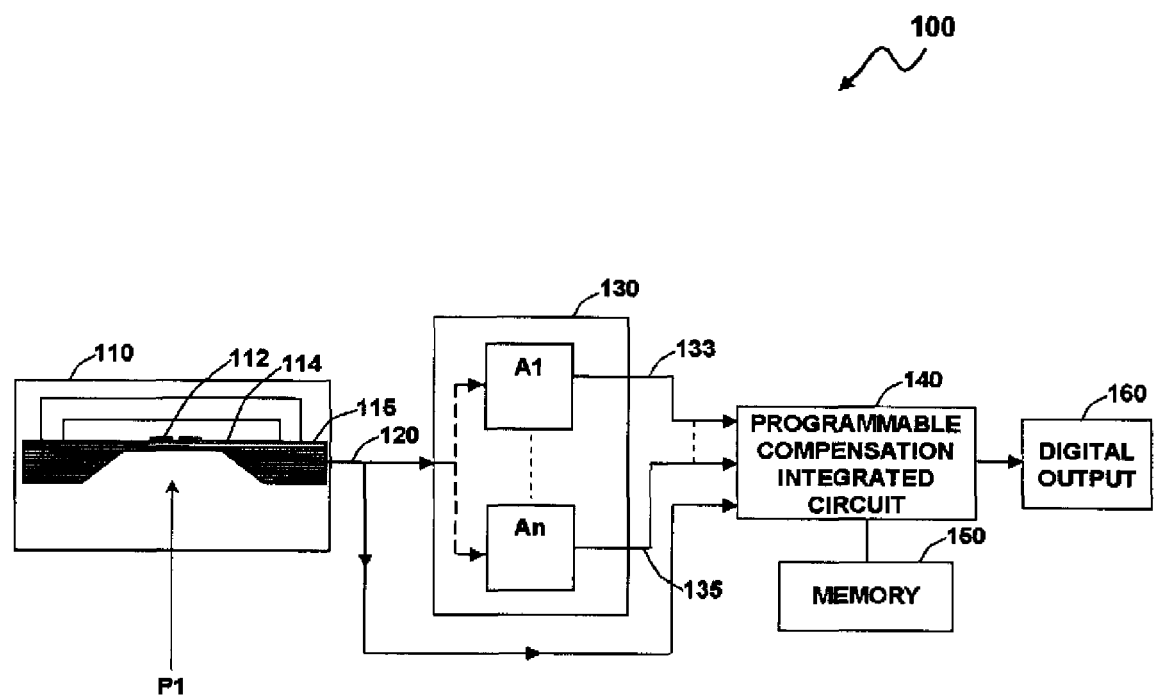
FIG. 1 illustrates a block diagram of a multi-range pressure sensor apparatus with multiple signal paths, which can be implemented in accordance with a preferred embodiment.

FIG. 1 illustrates a block diagram of a multi-range pressure sensor apparatus 100 with multiple signal paths, which can be implemented in accordance with a preferred embodiment. The pressure sensor apparatus 100 generally includes a pressure transducer 110, an amplifier circuit 130, and a programmable compensation circuit 140. Note that the programmable compensation circuit 140 can be implemented in the form of an integrated circuit. The pressure transducer 110, amplifier circuit 130, and programmable compensation circuit 140 are capable of communicating electrically with one another. The pressure transducer 110 generally incorporates a single sense die 115 with a pressure-sensing diaphragm 114.

The sensor die 115 can also be configured to incorporate a Wheatstone bridge circuit configuration, referred to simply as a "Wheatstone bridge". One or more piezoresistors (e.g., four piezoresistors) such as piezoresistors 112 can be embedded in the diaphragm 114 at locations that maximize the output of the sensor's Wheatstone bridge (not shown). The diaphragm 114 can be deformed in accordance with the pressure P1 applied by a media. The deformation can be measured by piezoresistive elements 112 doped on a surface of the diaphragm 114.

The piezoresistive elements 112 can convert the deformation of the diaphragm 114 into electrical signals utilizing well-known piezoresistive principles in order to compute the pressure in the media. As shown in FIG. 1, a pressure is applied to the sense die 115 as indicated by arrow P1. A sensed output signal 120 from the pressure transducer 110 can be fed to an amplifier circuit 130, comprising a number of amplifiers A1-An. The amplifier circuit 130 amplifies the low-level output 120 in milli-volts to a high-level amplified output in the range of about one volt to five volts maximum. Multiple signal paths such as signal path 133 and 135 from the amplifier circuit 130 can then be transferred to a programmable compensation circuit 140 associated with a memory 150. The programmable compensation circuit 140 possesses the ability to multiplex the amplified output signals 133 and 135 and provide a digital output 160. The multiple signal paths 133 and 135, each path having a different gain, allows for multiple compensated ranges in the single transducer 110.

Such an apparatus 100 can be exposed to large overpressures without being damaged. Also, the apparatus 100 can be exposed to large overpressures without undergoing a significant pressure hysteresis. In other words, subjecting the apparatus 100 to pressures substantially greater than the pressures of the working range of the transducer 110 does not adversely affect the accuracy of the transducer 110 on subsequent measurements within the working range thereof.

Figure 2:
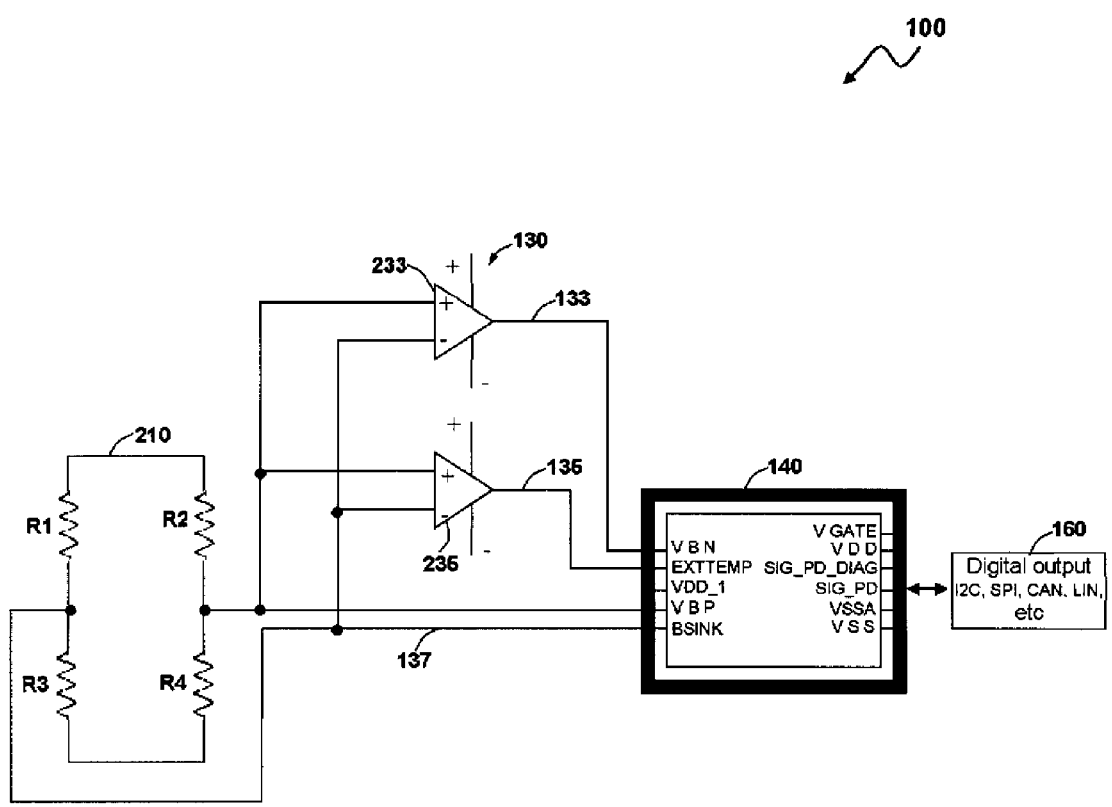
FIG. 2 illustrates a schematic diagram of the multi-range pressure sensor apparatus with multiple signal paths, in accordance with a preferred embodiment.

FIG. 2 illustrates a schematic diagram of the multi-range pressure sensor apparatus 100 with multiple signal paths, in accordance with the preferred embodiment. Note that in FIGS. 1-3, identical, similar parts, or elements are referred by identical reference numerals. A piezoelectric pressure sensing network 210 can be formed as an integral part of the pressure sense die 115 to sense flexing of the diaphragm 114 and produce an electrical signal in response thereto. The piezoelectric network 210 includes piezoresistors R1, R2, R3 and R4. Electrical connection can be provided for connecting the piezoresistors R1, R2, R3 and R4 to circuitry connection sites for associated sensor circuitry. Conductive leads can be embedded in the die 115 to connect the R1, R2, R3 and R4 in a full Wheatstone bridge configuration.

The resistors R1 and R3 forms one arm of the Wheatstone bridge 210 while the variable resistor R4 and the fixed resistor R2 make up the other arm of the bridge circuit 210. In the circuit configuration of FIG. 2, there is maximum pressure sensitivity when the piezoresistors R1, R2, R3 and R4 have similar resistances, each varying with the magnitude of the strain to which they are exposed. The resistors R1, R2, R3 and R4 can be formed in accordance with well-known metalization techniques of any material having suitable thin film resistance properties and suitable deposition characteristics. Preferably, the resistors R1, R2, R3 and R4 are formed of nickel or platinum. Additional processing or treatment apparent to those skilled in the art can be applied to the surface of pressure sense die 115 to improve robustness with respect to media compatibility and potential ionic contamination.

The electric signals from the Wheatstone Bridge 210 can be transferred to the amplifiers 233 and 235 and the programmable compensation circuit 140. The differential gain can be obtained from the multiple signal paths 133 and 135 generated by the amplifiers 233 and 235 and the direct signal path 137. It will be readily apparent that while two amplifiers 233 and 235 have been illustrated, additional amplifiers for measuring broader operative pressure ranges may be added when larger overall ranges of pressure are to be measured, each of the added amplifiers also furnishing an amplified output signal supplied as an input to the programmable integrated circuit 140.

The programmable compensation circuit 140 is a versatile integrated circuit chip, the internal circuitry of which may be configured by an individual user to realize a user-specific circuit. For example, to configure a programmable compensation circuit 140, the user configures an on-chip interconnect structure of the programmable IC 140 so that selected input terminals such as VBN, EXTTEMP, VDD_1, VBP, BSINK and selected output terminals such as VGATE, VDD, SIG_P-D_DIAG, SIG_PD, VSSA, VSS of selected on-chip circuit components are electrically connected together in such a way that the resulting circuit is the user-specific circuit desired by the user. The programmable compensation circuit 140 receives signals 133 and 135 and the direct signal 137 to produce the separate compensation for each of the different signal paths. Such compensation values can be stored in the memory 150 for each signal path, which allows high accuracy compensation at low system cost. The sensor apparatus 100 comprises either a stand-alone memory IC or with memory integral to the programmable compensation circuit 140, which provides separate compensations for each of the different signal paths. Such an approach removes errors due to amplifier gain and offset.

Figure 3:
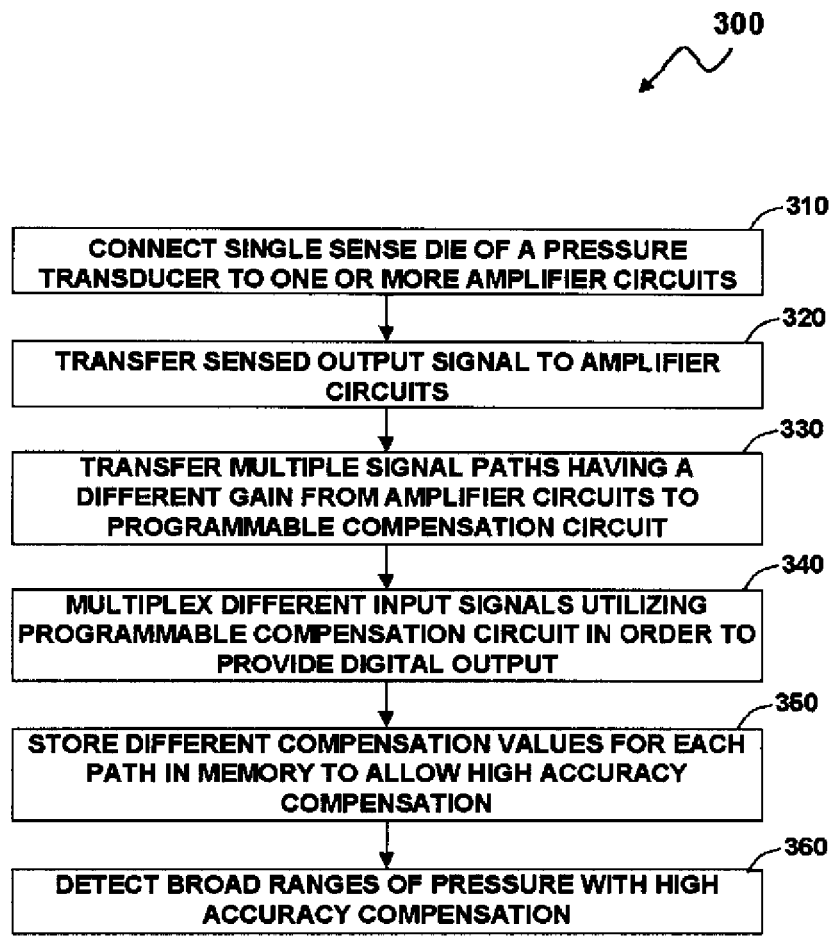
FIG. 3 illustrates a flow chart of operations illustrating logical operational steps of a method for sensing broad ranges of pressures with high accuracy utilizing the multi-range pressure sensor apparatus with a single sense die and multiple signal paths, which can be implemented in accordance with an alternative embodiment.

FIG. 3 illustrates a flow chart of operations illustrating logical operational steps of a method 300 for sensing broad ranges of pressures with high accuracy utilizing the multi-range pressure sensor apparatus 100 with a single sense die and multiple signal paths, which can be implemented in accordance with an alternative embodiment. A single sense die 115 of the pressure transducer 110 can be connected to the amplifier circuit 130 comprising one or more amplifiers 233 and 235, as depicted at block 310. Thereafter, as indicated at block 320, the sensed output signal from the pressure transducer 110 can be transferred to the amplifier circuits 130. The multiple signal paths 133 and 135, having a different gain from amplifier circuits 130, can then be transferred to a programmable compensation circuit 140, as illustrated at block 330. The different input signals 133 and 135 can be multiplexed utilizing programmable compensation circuit 140 in order to provide digital output 160, for which compensation values can be provided, as depicted at block 340.

The compensation values for each of the different signal paths 133 and 135 can be stored in the memory 150 integrated to the programmable integrated circuit 140 to allow high accuracy compensation, as indicated at block 350. The multi-range pressure sensor apparatus 100 detects broad ranges of pressure with high-pressure compensation, as shown at block 360. The multiple signal paths of the sense die 115 with potentially different compensation values stored for each path can generate high accuracy compensations at a low system cost. Each path of the multiple signal paths possesses a different gain that can provide multiple compensated ranges in the pressure sensor. The amplifier circuits 140 of the pressure sensor 110 can be integral to the sense die 115, integral to the programmable compensation circuit 140, or isolated to provide error free output generated due to amplifier gain and offset.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A multi-range sensor apparatus, comprising:
   a sensor for producing a sensor output signal at a sensor output;
   a compensation circuit;
   an amplification circuit connected between the sensor output and the compensation circuit, the amplification circuit configured to amplify the sensor output signal using a first gain to produce a first amplified sensor output signal, and to amplify the sensor output signal using a second gain to produce a second amplified sensor output signal;
   a memory associated with the compensation circuit, wherein said memory stores a first compensation parameter for the first amplified sensor output signal and a separate second compensation parameter for the second amplified sensor output signal; and
   the compensation circuit configured to receive the first and second amplified sensor output signals from the amplification circuit, and to apply the first compensation parameter to the first amplified sensor output signal and the second compensation parameter to the second amplified sensor output signal.

2. The multi-range sensor apparatus of claim 1, wherein the amplification circuit can be set to gain $G_1$ to $G_n$ produce associated amplified signals $A_1$ to $A_n$, where "n" is an integer greater than one.

3. The multi-range sensor apparatus of claim 1, wherein the amplification circuit produces the first and second amplified sensor output signals in parallel, and the compensation circuit includes a multiplexer for selecting between the first and second amplified sensor output signals.

4. The multi-range sensor apparatus of claim 2, wherein the amplification circuit includes at least two amplifiers $A_1$-$A_n$ connected in a parallel arrangement, wherein at least two of the amplifiers $A_1$-$A_n$ have different gains $G_1$-$G_n$.

5. The multi-range sensor apparatus of claim 1, wherein the sensor output signal is an analog signal, and the compensation circuit produces a digital output signal.

6. The multi-range sensor apparatus of claim 1, wherein the sensor is a pressure sensor.

7. The multi-range sensor apparatus of claim 6, wherein the pressure sensor is on a sense die, and wherein the sense die does not include the amplification circuit or the compensation circuit.

8. The multi-range sensor apparatus of claim 2, wherein the sensor is a pressure sensor.

9. The integrated circuit of claim 1, wherein each of the first and second amplified sensor output signals corresponds to one of two or more separate overlapping or non-overlapping pressure ranges of the sensor output signal.

10. An integrated circuit for processing an analog sensor output signal from a sensor, comprising:
    an amplifier configured to receive the sensor output signal from the sensor and amplify the sensor output signal using at least two different gain values to produce at least two corresponding amplified sensor output signals;
    a memory, wherein said memory stores separate compensations for each of the at least two amplified sensor output signals; and
    a compensation block receiving the at least two amplified sensor output signals from the amplifier, and applying the compensations stored in the memory to the corresponding amplified sensor output signals, and outputting a compensated output signal.

11. The integrated circuit of claim 10, wherein the compensated output signal of the compensation block corresponds to a first one of the at least two amplified sensor output signals.

12. The integrated circuit of claim 10, wherein the compensated output signal of the compensation block corresponds to a first one of the at least two amplified sensor output signals at a first time, and corresponds to a second one of the at least two amplified sensor output signals at a second time, wherein the second time is later than the first time.

13. The integrated circuit of claim 10, wherein the amplifier includes at least two amplifiers $A_1$-$A_n$ connected in a parallel arrangement, wherein at least two of the amplifiers $A_1$-$A_n$ have different gains.

14. The integrated circuit of claim 13, wherein the compensation block includes a multiplexer for multiplexing between the at least two amplifiers $A_1$-$A_n$.

15. The integrated circuit of claim 10, wherein the sensor output signal is an analog signal, and the compensated output signal is a digital signal.

16. The integrated circuit of claim 10, wherein each of the at least two amplified sensor output signals corresponds to a corresponding one of two or more ranges of the sensor output signal.

17. A method for processing an analog sensor output signal from a sensor, comprising:
    receiving the sensor output signal from the sensor;
    amplifying the sensor output signal using a first gain to produce a first amplified sensor output signal;
    amplifying the sensor output signal using a second gain to produce a second amplified sensor output signal;
    applying a first compensation parameter set to the first amplified sensor output signal, resulting in a first compensated amplified sensor output signal;
    applying a second compensation parameter set, which is separate from the first compensation parameter set, to the second amplified sensor output signal, resulting in a second compensated amplified sensor output signal;
    outputting an output signal that corresponds to the first compensated amplified sensor output signal; and
    outputting an output signal that corresponds to the second compensated amplified sensor output signal.

18. The method of claim 17, wherein the output signal that corresponds to the first compensated amplified sensor output signal is output at a first time, and the output signal that corresponds to the second compensated amplified sensor output signal is output at a second time, wherein the second time is later than the first time.

19. The method of claim 18, further comprising:
multiplexing to select between:
the output signal that corresponds to the first compensated amplified sensor output signal; and
the output signal that corresponds to the second compensated amplified sensor output signal.

20. The method of claim 17, further comprising:
retrieving the first compensation parameter set from a memory before applying the first compensation parameter set to the first amplified sensor output signal; and
retrieving the second compensation parameter set from the memory before applying the second compensation parameter set to the second amplified sensor output signal.

21. The method of claim 17, wherein the first compensation parameter set corresponds to a first range of said the sensor output signal, and the second compensation parameter set corresponds to a second range of said the sensor output signal.

22. The method of claim 17, wherein the sensor corresponds to a pressure sensor.

\* \* \* \* \*